US009886162B2

United States Patent
Berelejis et al.

(10) Patent No.: US 9,886,162 B2
(45) Date of Patent: Feb. 6, 2018

(54) DEVICE-PROVIDED TRACKING DATA FOR AUGMENTED REALITY

(71) Applicant: QUALCOMM Incorporated, San Diego, CA (US)

(72) Inventors: Gabriel Berelejis, Mevaseret Zion (IL); Ravinder Paul Chandhok, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 14/507,591

(22) Filed: Oct. 6, 2014

(65) Prior Publication Data

US 2015/0347850 A1 Dec. 3, 2015

Related U.S. Application Data

(60) Provisional application No. 62/006,749, filed on Jun. 2, 2014.

(51) Int. Cl.
*G06K 9/00* (2006.01)
*G06T 19/00* (2011.01)
(Continued)

(52) U.S. Cl.
CPC ..... *G06F 3/04815* (2013.01); *G06K 9/00671* (2013.01); *G06T 19/006* (2013.01);
(Continued)

(58) Field of Classification Search
CPC ... G06T 19/006; G06K 9/00671; H04L 69/08; G06F 21/445; H04N 21/4126
See application file for complete search history.

(56) References Cited

U.S. PATENT DOCUMENTS 5,731,785 A * 3/1998 Lemelson ............. G01S 5/0027
342/357.31
7,047,525 B2 * 5/2006 Prunty ................ G06F 17/3092
707/E17.126
(Continued)

FOREIGN PATENT DOCUMENTS

| EP | 2293531 | 3/2011 |
|---|---|---|
| WO | 2013126292 | 8/2013 |
| WO | 2013154476 | 10/2013 |

OTHER PUBLICATIONS

Perumal et al., Interoperability Framework for Smart Home Systems, Nov. 2011, IEEE Transactions on Consumer Electronics, vol. 57, No. 4, p. 1607-1611*

(Continued)

*Primary Examiner* — Yuehan Wang
(74) *Attorney, Agent, or Firm* — DeLizio Law, PLLC (57) ABSTRACT

A networked device may provide tracking data associated with the networked device to an augmented reality (AR) device via a local network. The tracking data may describe one or more trackable features of the networked device. The AR device may utilize the tracking data to detect the networked device in a camera view. The AR device may generate an augmented reality view in association with the networked device in response to detecting at least one trackable feature of the networked device in the camera view of the AR device. At least a portion of the augmented reality view can be augmented with AR properties associated with the networked device when the networked device is positioned in the camera view.

30 Claims, 6 Drawing Sheets

(51) Int. Cl.
*G06F 3/0481* (2013.01)
*H04Q 9/00* (2006.01)
*H04L 29/08* (2006.01)
*G08C 17/02* (2006.01)
*H04M 1/725* (2006.01)

(52) U.S. Cl.
CPC ............ *G08C 17/02* (2013.01); *H04L 67/125* (2013.01); *H04L 67/22* (2013.01); *H04Q 9/00* (2013.01); *H04M 1/7253* (2013.01); *H04M 1/72544* (2013.01); *H04Q 2209/43* (2013.01)

(56) References Cited

U.S. PATENT DOCUMENTS

| | | |
|---|---|---|
| 7,127,082 B2 | 10/2006 | Neely |
| 8,180,396 B2 | 5/2012 | Athsani et al. |
| 8,442,502 B2 | 5/2013 | Leung |
| 2010/0185529 A1 | 7/2010 | Chesnut et al. |
| 2011/0090252 A1 | 4/2011 | Yoon et al. |
| 2012/0190455 A1* | 7/2012 | Briggs ............... H04L 67/38 463/42 |
| 2013/0155107 A1 | 6/2013 | Ashour et al. |
| 2013/0223279 A1 | 8/2013 | Tinnakornsrisuphap et al. |
| 2014/0100997 A1 | 4/2014 | Mayerle et al. |
| 2015/0146007 A1* | 5/2015 | Dusik ................ G06K 9/00671 348/161 |
| 2015/0269398 A1* | 9/2015 | Zumsteg ............ G06K 7/10099 235/440 |

OTHER PUBLICATIONS

"PCT Application No. PCT/US2015/30859 International Search Report", dated Aug. 5, 2015, 10 pages.
"PCT Application No. PCT/US2015/30859 Written Opinion", May 30, 2016, 6 pages.

* cited by examiner

DEVICE-PROVIDED TRACKING DATA FOR AUGMENTED REALITY

This application claims the priority benefit of U.S. Provisional Patent Application Ser. No. 62/006,749 filed Jun. 2, 2014.

BACKGROUND

Embodiments of the disclosed subject matter generally relate to the field of electronic devices, and, more particularly, to augmented reality.

Augmented reality (AR) is a technology that enhances a live view of the real world with virtual, computer-generated objects such as stationary and/or moving images, text, data, etc. In AR, a camera view of a physical, real-world environment may be augmented (or supplemented) by computer-generated sensory input. An AR device refers to a device which runs an AR application. An AR application may augment a camera view to show information about objects in the camera view. For example, some AR applications overlay information about points of interest and geographic landmarks. More recently, AR applications can augment a camera view to provide information or user interface actions associated with nearby objects. For example, an AR application may recognize an object (sometimes referred to as a trackable object) in the camera view and augment the camera view with additional information or user interface actions related to the object. To recognize objects in the camera view, the AR application may require tracking data which describes the object to be tracked. Once an object is identified in a camera view using the tracking data, the AR application can augment the camera view with additional information about the object.

SUMMARY

Various embodiments are described in which an AR device may recognize a trackable object which can communicate via a local network. An object that can communicate via a local network may be referred to as a networked device. Tracking data that describes the networked device may be provided by the networked device via the local network to the AR device. For example, the tracking data may be embedded in the networked device.

In one embodiment, an AR device may receive tracking data that describes one or more trackable features of the networked device, wherein the tracking data is received from the networked device via a local network. The AR device may display an augmented reality view in association with the networked device in response to detecting at least one trackable feature of the networked device in a camera view of the AR device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present subject matter. However, it is understood that the described embodiments may be practiced without these specific details. For instance, although examples refer to visual properties for a trackable feature of the networked device, tracking data may also describe other properties a trackable feature, including auditory, infrared, patterns, or other properties which may be sensed by the AR device. In other instances, well-known instruction instances, protocols, structures and techniques have not been shown in detail in order not to obfuscate the description.

An AR device may include a processor, memory, and a display housed in an electronic device. The AR device can be any suitable electronic device, e.g., desktop, laptop, hand-held, mobile, or wearable computer. A camera may be integrated in the AR device or may be external to the AR device. The camera may provide a live view, sometimes referred to as the "camera view," to the AR device. The AR device may execute an AR application to determine the position of the camera view in the real world and detect any objects (e.g., AR-enabled objects) in the camera view. When an object is detected, the AR application may generate an augmented reality view based on the camera view and computer-generated overlay information (such as virtual objects, images, user interface controls, etc.) related to the object. The overlay information may be referred to as AR properties.

To detect the object and determine a position of the object in the camera view, the AR device may use tracking data that describes an object to be tracked. Tracking data may describe a variety of trackable features (sometimes referred to as "trackables") based on patterns that can be searched, recognized and/or tracked in the camera view. In this disclosure, tracking data may describe fixed markers or may describe characteristics for markerless detection. Fixed markers are known characteristics that can be identified using pattern matching or image matching. For fixed markers, the tracking data may include interest points, fiduciary markers, quick response (QR) codes, images to be matched, or any "trackable" pattern. Markers can be of any design, now known or developed in the future, including a circular, linear, matrix, variable bit length matrix, multi-level matrix, black/white (binary), gray scale patterns, and combinations thereof. The markers can be two- or three-dimensional barcodes.

In markerless detection, an AR device can detect an object based on descriptive characteristics rather than a fixed marker. For markerless tracking, the tracking data may include descriptions based on edges, points, corners, flat surfaces, colors, sizes, shapes, geometry, etc. In some embodiments, the tracking data may include a multi-dimensional (e.g., 2D or 3D) model of an object so that the AR device can detect the object regardless of which angle the camera view has in relation to the object.

In conventional AR applications, the tracking data may be hard coded in an AR application or may be downloaded from a cloud server via a wide area network. However, a new object may be introduced into an environment, and the AR application may not have tracking data associated with the new object. It may be undesirable to download tracking data from a network-based server during an augmented reality session or for each new object introduced into an environment.

As described previously, some objects may communicate via a local network and may be referred to as networked devices. Examples of a local network may include a wireless local area network (WLAN) (such as IEEE 802.11a/b/g/n/ac/ad), short-range radio frequency medium (such as Bluetooth™), near field communication (NFC), powerline communication (PLC), Ethernet, or the like. In a local network, an AR device and a networked device may communicate using a protocol to support interoperability (which may be referred to as a device interoperability framework). For example, in an "Internet of Things" (IoT) environment, various devices may communicate using a communication protocol, such as AllJoyn™. Other protocols may be used by the various devices. A device interoperability framework protocol can be any protocol that allows an AR device and a networked device to communicate via a local network.

In accordance with this disclosure, a networked device may provide tracking data associated with the networked device to an AR device via the local network. The networked device can store tracking data and can provide the tracking data directly to the AR device via the local network. The tracking data may describe trackable features that enable the AR device to detect the networked device in a camera view. In one embodiment, an AR device may obtain the tracking data from the networked device using the device interoperability framework protocol. Because the tracking data may be obtained via the local network, the AR device may be the tracking data without communicating with a wide area network server or without having the tracking data previously coded into an AR application. In one embodiment, the tracking data may be in the form of a local protocol extension, AR markup language, or object description property.

Figure 1:
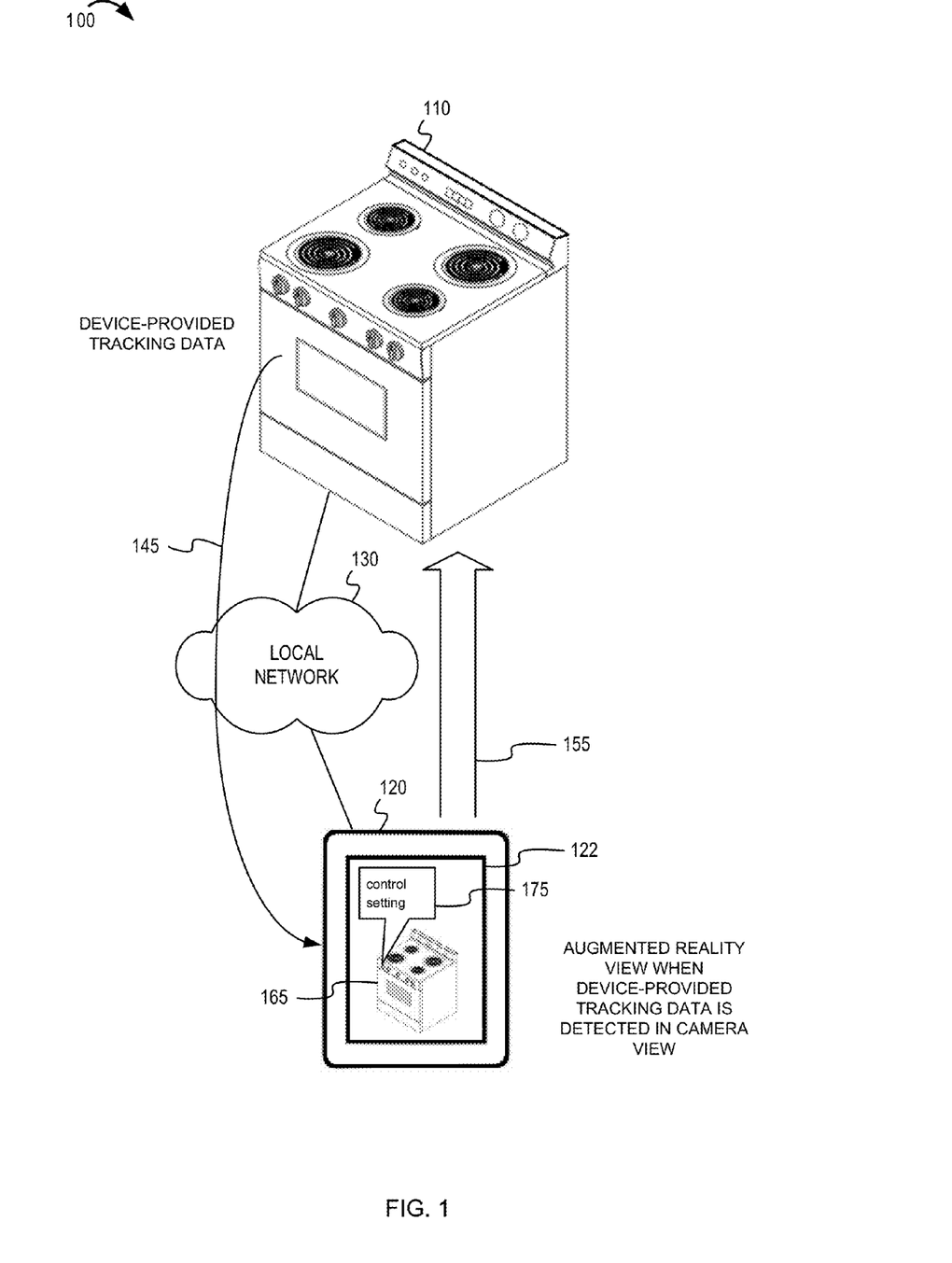
FIG. 1 depicts an example system to introduce various concepts of this disclosure.

FIG. 1 depicts an example system 100 to introduce various concepts of this disclosure. The example system 100 includes a networked device 110, a local network 130, and an AR device 120. In the example system 100, a networked device 110 is depicted as a smart appliance—such as a stove. The networked device 110 may be any type of device which is AR-enabled and that can communicate via the local network 130. The local network 130 may be a powerline communication network, a wireless local area network, short range radio frequency network, or the like. The AR device 120 can also communicate via the local network 130. In the example system 100, the AR device 120 is depicted as a tablet computer. The AR device 120 and the networked device 110 may be of different forms or machines, and the examples in FIG. 1 are provided for illustrative purposes.

In one embodiment, the networked device 110 is configured to provide tracking data (shown as arrow 145) to the AR device 120 via the local network 130. The networked device 110 may communicate the tracking data using a device interoperability framework message. For example, message may be an AllJoyn™ protocol message or another suitable interoperability framework message associated with a message syntax. In one example, the local network 130 comprises a wireless local area network providing a wireless coverage range. Devices such as the networked device 110 and AR device 120 that are associated with the wireless local area network may communicate using the device interoperability framework protocol. The networked device 110 may store the tracking data in local memory or in a storage device of the networked device 110 and provide the tracking data to the AR device 120 in a device interoperability framework protocol message. In another embodiment, the networked device 110 may provide the tracking data using a standardized or extensible protocol message.

The AR device 120 may receive the tracking data from the networked device 110 and use the tracking data to detect the networked device 110 in a camera view of the AR device 120. For example, the AR device 120 may analyze the camera view to detect edges, feature points, colors, shapes, sizes, etc., as may be described in the tracking data. When the camera view is located in such a way that the networked device 110 is positioned in the camera view, the AR device 120 may detect (shown as arrow 155) the networked device 110 based on the tracking data. As an example, referring to the illustrative example of FIG. 1, the tracking data may describe the color, size, shape, or geometry associated with the control knobs of the stove. In one example, the control panel may be a trackable feature of the networked device 110. The knobs may represent feature points, and the distance between the feature points may be described by the tracking data. By analyzing the camera view to detect the feature points and distance between the feature points, the AR device 120 may detect a pattern consistent with the knobs of the stove as described in the tracking data.

Once the networked device 110 has been detected, the AR device 120 may register the networked device 110 as a trackable object in an augmented reality view. In FIG. 1, the networked device 110 is in the camera view 165, and the AR device 120 has enhanced the camera view to include an AR property 175 associated with the networked device 110.

The AR device 120 may generate an augmented reality view that includes the images of the real world enhanced with overlay information associated with the detected AR objects (i.e., networked device 110). The overlay information may be predefined or obtained via a wide area network server. In one embodiment, the overlay information may also be provided by the networked device 110, similar to the tracking data 145. In FIG. 1, the AR device 120 includes a display apparatus 122 that displays the augmented reality view to a user of the AR device 120.

In one embodiment, one or both of the camera and the display apparatus 122 may be integrated into the AR device 120. However, in other embodiments, one or both of the camera and the display apparatus 122 may be external to the AR device 120. For example, one or both of the camera and display apparatus may be part of a wearable accessory, such as electronic glasses worn by a user. The camera and/or display apparatus may be external components of a computer system that comprises the AR device 120. In another embodiment, the AR device 120 may be part of a home network that includes a camera and/or display (e.g., television) that are in communication with the AR device 120.

Figure 2:
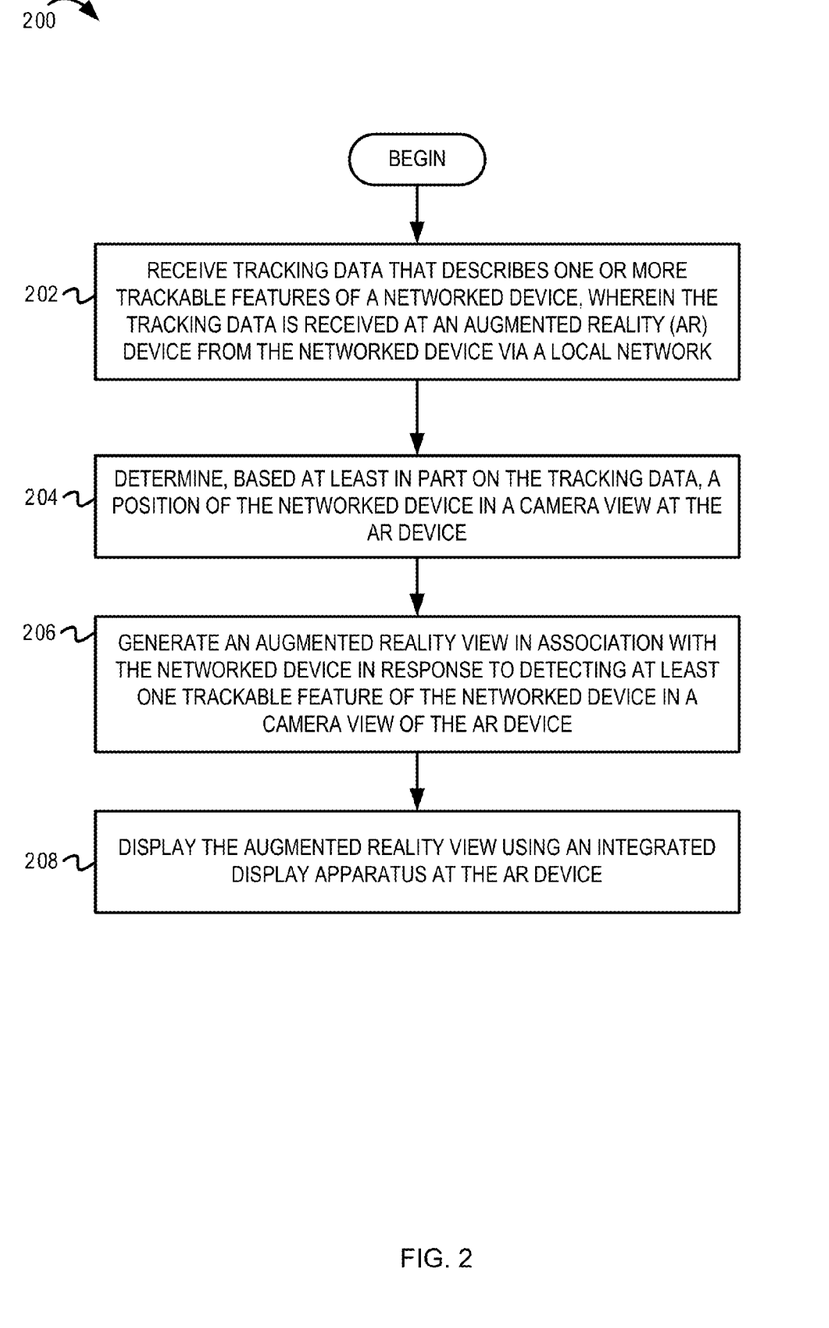
FIG. 2 depicts example operations using tracking data for augmented reality.

FIG. 2 depicts example operations (flowchart 200) using tracking data for augmented reality. At block 202, the AR device may receive tracking data that describes one or more trackable features of a networked device, wherein the tracking data is received from the networked device via a local network. At block 204, the AR device may determine, based at least in part on the tracking data, a position of the networked device in a camera view at the AR device. At block 206, the AR device may generate an augmented reality view in association with the networked device in response to detecting at least one trackable feature of the networked device in a camera view of the AR device. At block 208, the AR device may display the augmented reality view. The augmented reality view may be displayed using an integrated display apparatus at the AR device or an external display in communication with the AR device.

Figure 3:
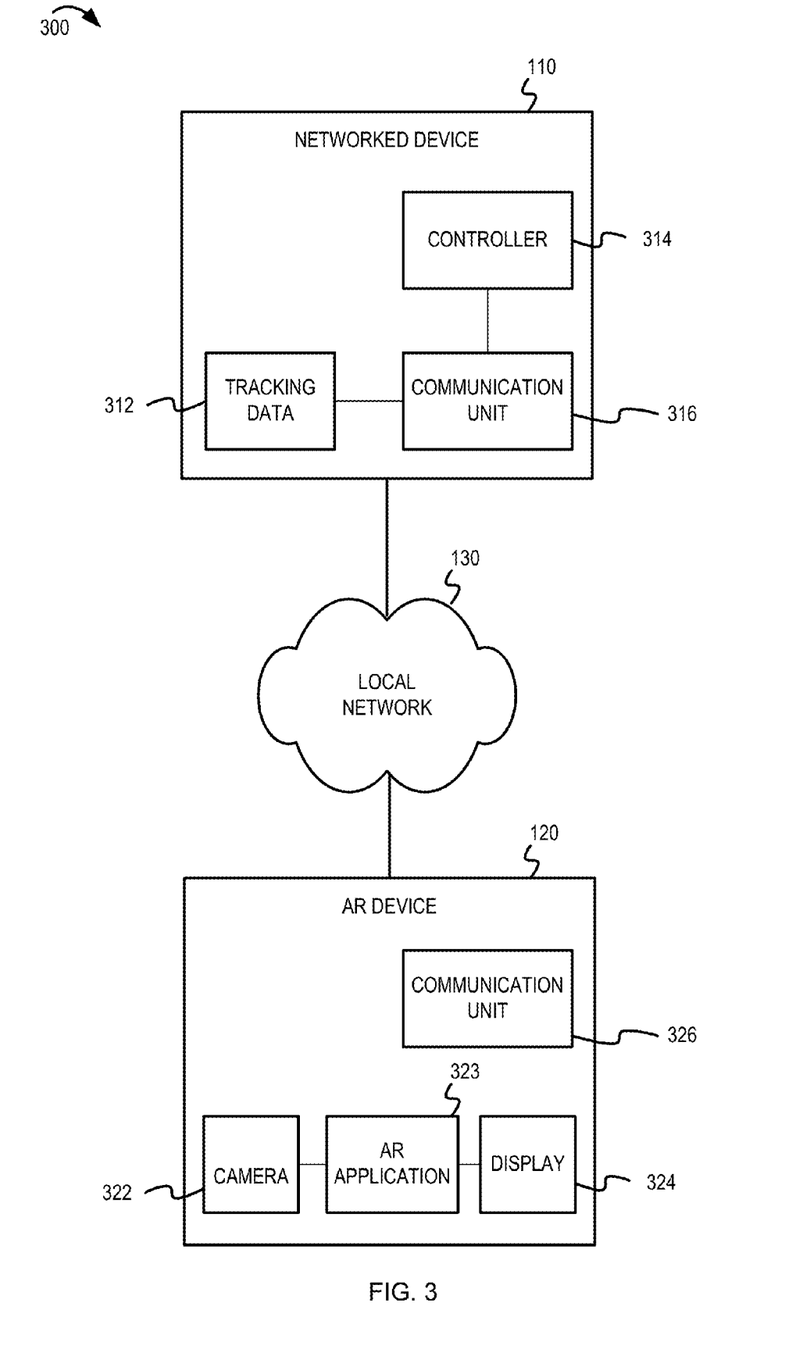
FIG. 3 depicts example components that may be used in various embodiments of this disclosure.

FIG. 3 depicts example components that may be used in one embodiment of this disclosure. In FIG. 3, an example system 300 includes a networked device 110 and an AR device 120, both coupled to a local network 130. The networked device 110 may include a communication unit 316, a controller 314, and tracking data 312. The controller 314 may control other aspects (not shown) of the networked device 110. For example, the controller 314 may control a temperature setting of the stove in FIG. 1. Other examples in which a controller 314 may control aspects of the networked device 110 may be conceived. Examples may include control of power, lighting, temperature, intensity, etc.

The tracking data 312 may be stored in a memory (not shown) associated with the networked device 110. The communication unit 316 may comprise a network interface to couple the networked device 110 to the local network 130. In one embodiment, the communication unit 316 may implement a device interoperability framework protocol which can be used to convey the tracking data 312 to the AR device 120. In one embodiment, the controller 314 may be remotely controllable using an AR application 323 of the AR device 120.

The AR device 120 of FIG. 3 includes a camera 322, AR application 323, display 324, and a communication unit 326. The communication unit 326 may comprise a network interface and may couple the AR device 120 to the local network 130. The AR application 323 may be configured to receive the tracking data from the networked device 110. The AR application 323 may process the tracking data as needed to enable detection of the networked device 110 by the AR application 323.

The AR application 323 may use a camera view from the camera 322 to generate an augmented reality view. The augmented reality view may be output by the display 324. The camera or other video input may generate a digitized video image of the real world, which is referred to as a camera view in this disclosure. The camera may be any digital device now known or developed in the future that is dimensioned and configured to capture still or motion pictures of the real world and to convert those images to a digital stream of information that can be manipulated by the AR device 120. For example, the camera may be a digital still camera, a digital video camera, a web cam, a head-mounted display, a camera phone, a tablet personal computer, or any camera that renders a digital image or stream of images over which augmented reality data may be added.

In one embodiment, the tracking data may describe one or more trackable features associated with the networked device. In one example, the trackable feature may also be an image of a real world item which the AR application 323 can recognize. For example, the AR application 323 can recognize a refrigerator or other appliance in a video stream of a kitchen based on an image of the refrigerator in the tracking data. In another embodiment, the tracking data may be used to describe features of the networked device 110 when no markers are present. For example, the tracking data may describe the color, shape, size, and geometry, etc. regarding one or more trackable features of the networked device 110.

Figure 4:
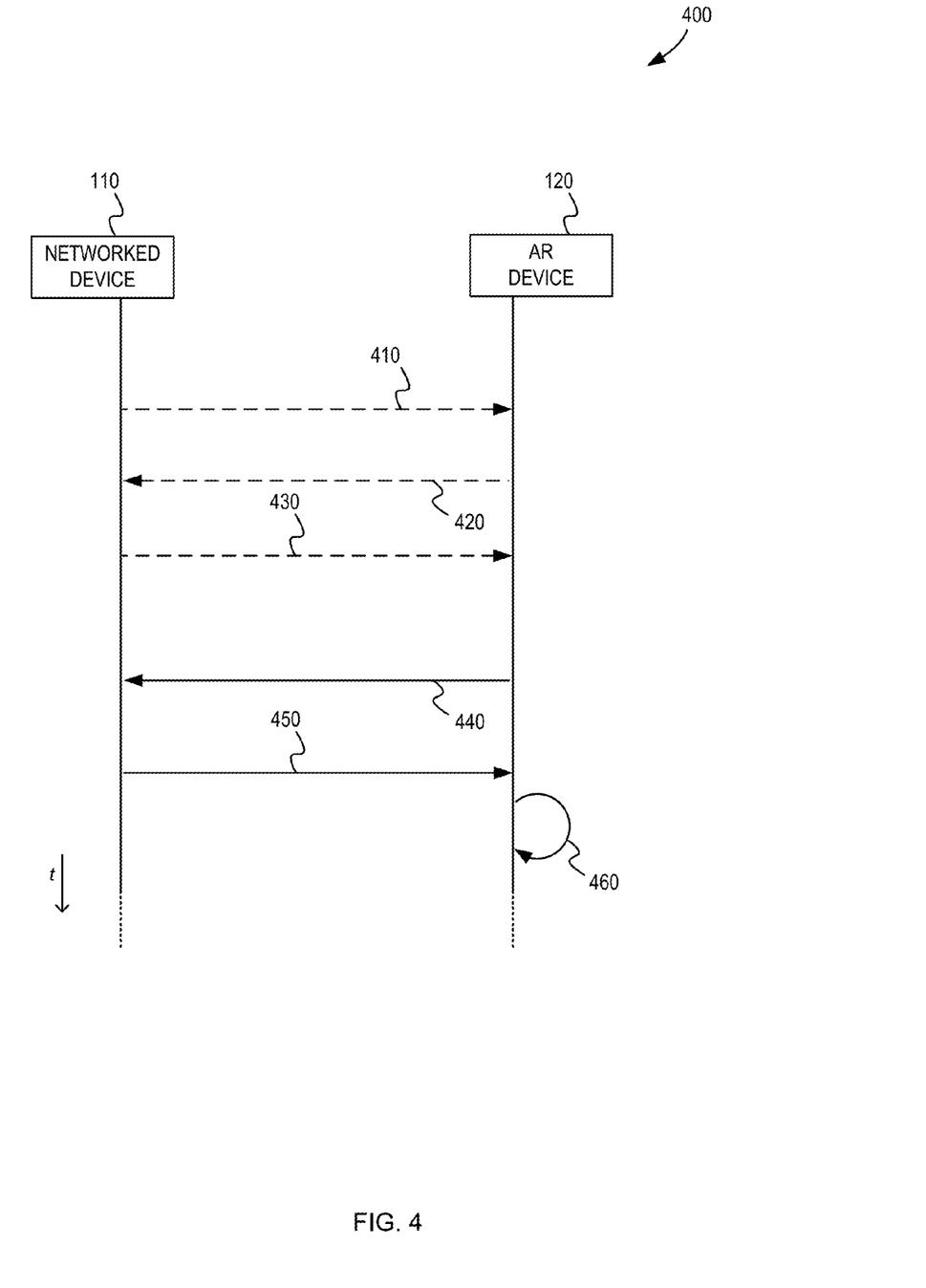
FIG. 4 depicts a message flow of example messages between a networked device and an AR device in a local network in accordance with an embodiment of this disclosure.

FIG. 4 depicts a message flow 400 of example messages between a networked device 110 and an AR device 120 using a device interoperability framework protocol. Initially, the AR device 120 may become aware that the networked device 110 has tracking data to provide to the AR device 120. There may be a number of ways that the AR device 120 determines that the networked device 110 can provide the tracking data. Depicted in FIG. 4, the networked device 110 may transmit a broadcast message 410 that includes an indicator that tracking data is available. For example, the broadcast message 410 may include a property of "AR_TrackingDataAvailable=Yes" or similar property. Alternatively, the broadcast message 410 may include some or all of the tracking data as part of the broadcast message 410. The broadcast message 410 may be part of a device discovery protocol.

In another example, the AR device 120 may send an AR enablement query message 420 to the networked device 110 to inquire whether the networked device 110 is AR-enabled. The AR enablement query message 420 may request, for example, the "AR_TrackingDataAvailable" property, or the like, from the networked device 110. Other augmented reality properties may be solicited in the AR enablement query message 420. The networked device 110 may respond to the AR enablement query message 420 by sending an AR enablement response message 430 to indicate whether the networked device 110 is AR-enabled. For example, the AR enablement response message 430 may include a property of "AR_TrackingDataAvailable=Yes" or similar property.

Once the AR device 120 determines that the networked device 110 is AR-enabled, the AR device 120 may attempt to obtain tracking data associated with the networked device 110. The AR device 120 may transmit an AR tracking data query message 440 to the networked device 110. The networked device 110 may respond with an AR tracking data response message 450 that includes the tracking data.

At detection process 460, the AR device 120 may use the tracking data to detect and register the networked device 110 in a camera view of the AR device 120. Once detected and registered, the AR device 120 may display overlay information (such as AR properties, controls, etc.) associated with the networked device 110 when the networked device 110 is positioned in the camera view of the AR device 120. For example, the AR device 120 may generate an augmented reality view based on the camera view and overlay information associated with the networked device 110. The augmented reality view can then be displayed by the AR device 120.

Figure 5:
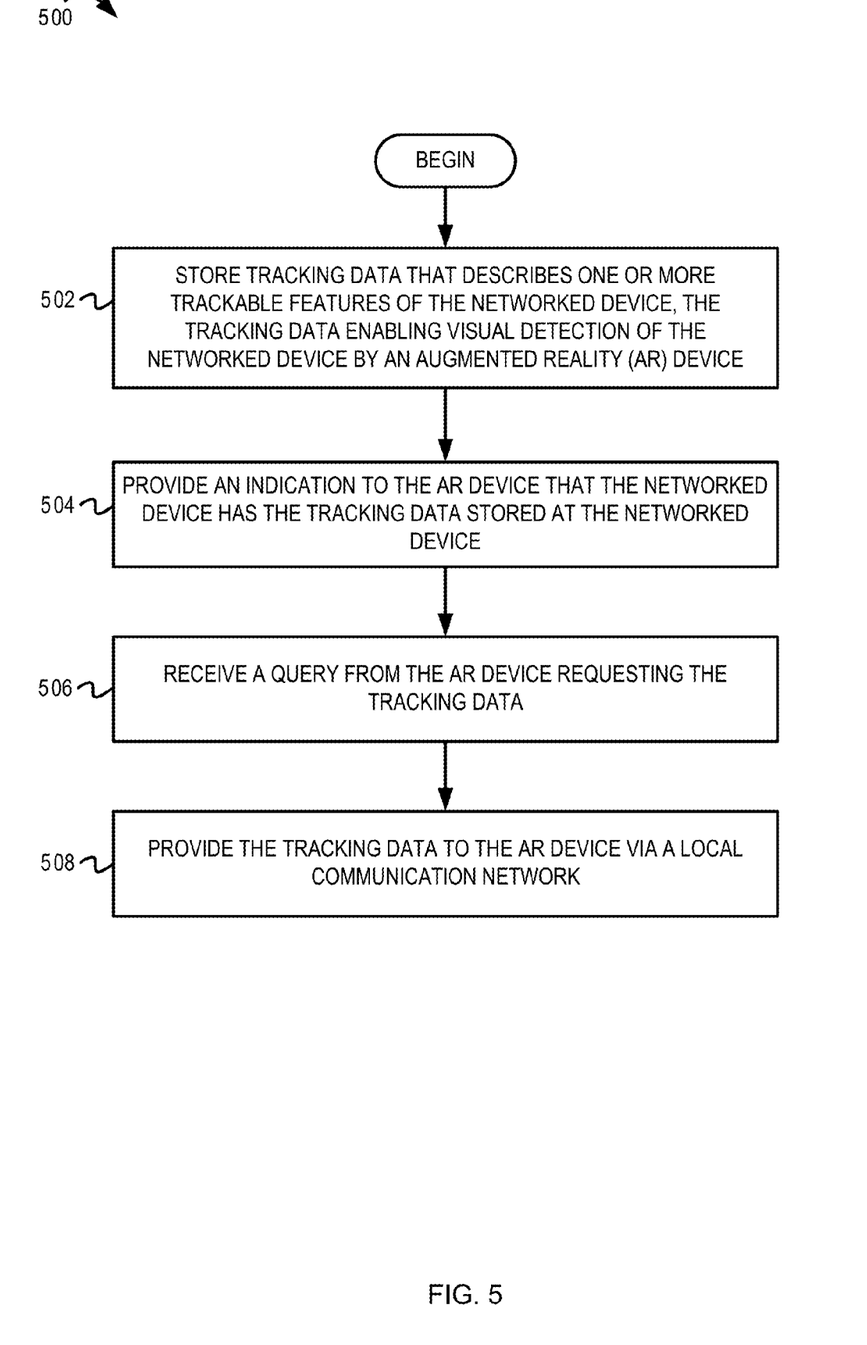
FIG. 5 depicts example operations performed by a networked device to provide tracking data in accordance with an embodiment of this disclosure.

FIG. 5 depicts example operations (flowchart 500) performed by a networked device to provide tracking data in accordance with an embodiment of this disclosure. At block 502, the networked device may store tracking data that describes one or more trackable features of the networked device, the tracking data enabling visual detection of the networked device by an augmented reality (AR) device. The memory or storage component may be integrated with the networked device, or may be an external memory storage communicatively coupled with the networked device.

At block 504, the networked device may optionally inform (e.g., via an indication in a protocol message or a broadcast message) the AR device that the networked device has the tracking data stored at the networked device. At block 506, the networked device may receive a query from the AR device requesting the tracking data. In some embodiments, the networked device may not receive a query from the AR device, but may instead simply broadcast the tracking data periodically. At block 508, the networked device may provide the tracking data to the AR device via a local network in response to the query.

The tracking data may be provided using a structured markup language in accordance with an embodiment of this disclosure. It will be appreciated that a variety of formats can be used to describe the tracking data, such as Augmented Reality Markup Language (ARML).

In one embodiment, a structured markup language file may be modified to include tracking data. A section of the structured markup language file may describe an object (e.g., networked device) that should be tracked. Another section of the structured markup language file may define one or more trackable features of the object that should be tracked. In the example of FIG. 1, a trackable feature may be a front control panel of the stove. The structured markup language file may include a tracking data field which contains the tracking data associated with the trackable feature. The tracking data may describe size, shape, color, edges, feature points, or other aspects of the trackable feature. The format of the tracking data may be text, binary data or any suitable format, and may be compressed or encrypted in some embodiments. The tracking data may also include modeling data such as a 2D or 3D model of the trackable feature. The structured markup language may include other AR properties (not shown) which further enhance the capabilities of the AR device to overlay information in relation with the networked device.

The example sequence of operations described above are but one possible example of many possible sequences. Many other sequences are possible, with different operations and different ordering of operations. The embodiments are not limited to any particular ordering of operations.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
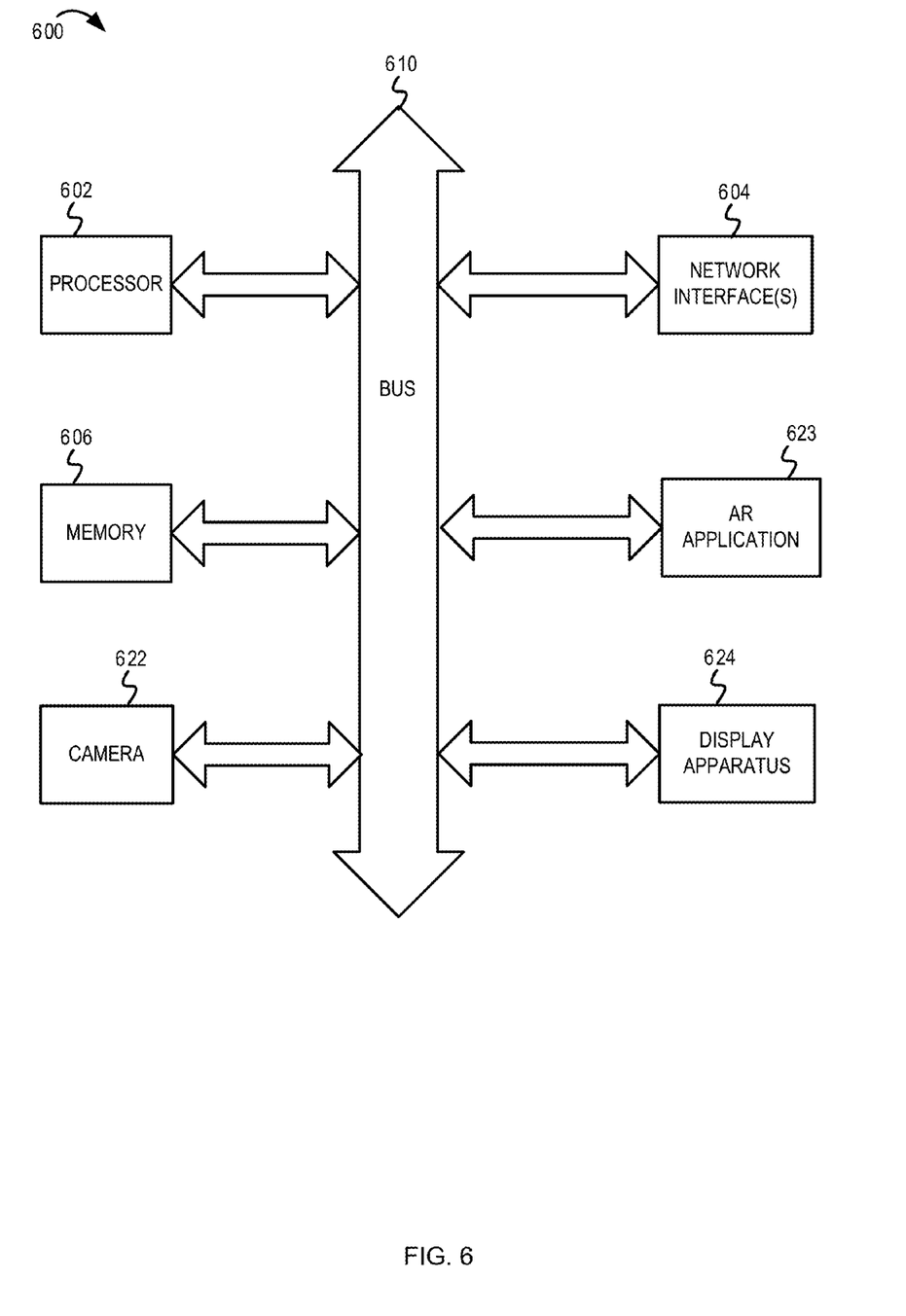
FIG. 6 depicts an example electronic device capable of implementing various embodiments of this disclosure.

FIG. 6 is an example block diagram of one embodiment of an electronic device 600 capable of implementing various embodiments of this disclosure. In some implementations, the electronic device 600 may be an electronic device such as a laptop computer, a tablet computer, a mobile phone, a powerline communication device, a gaming console, or other electronic systems. In some implementations, the electronic device may comprise functionality to communicate across multiple communication networks (which form a hybrid communication network). The electronic device 600 includes a processor 602 (possibly including multiple processors, multiple cores, multiple nodes, and/or implementing multi-threading, etc.). The electronic device 600 includes a memory 606. The memory 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 also includes a bus 610 (e.g., PCI, ISA, PCI-Express, HyperTransport®, InfiniBand®, NuBus, AHB, AXI, etc.) and may include one or more network interfaces 604. The one or more network interfaces 604 may include a wireless network interface (e.g., a WLAN interface, a Bluetooth® interface, a WiMAX interface, a ZigBee® interface, a Wireless USB interface, etc.) or a wired network interface (e.g., a powerline communication interface, an Ethernet interface, etc.).

The electronic device 600 includes an AR application 623. Optionally, the electronic device 600 may include one or both of a camera 622 and a display apparatus 624. While AR application 623 is depicted as a separate hardware component of the electronic device 600, it should be noted that the AR application 623 may be implemented as machine readable instructions stored in the memory 606 and executed by the processor 602. The AR application 623 may implement various embodiments of the foregoing figures. In one embodiment, the AR application 623, camera 622, and display apparatus 624 may operate similar to the corresponding components described in FIG. 3. The electronic device 600 may also be used to describe the networked device (such as networked device 110). However, the networked device may not have a camera 622, display apparatus 624, or AR application 623 in some embodiments. For example, the electronic device 600 may store the tracking data in the memory 606 and provide the tracking data via the local network using network interface 604.

Any one of these functionalities may be partially (or entirely) implemented in hardware and/or on the processor 602. For example, the functionality may be implemented with an application specific integrated circuit, in logic implemented in the processor 602, in a co-processor on a peripheral device or card, etc. Further, realizations may include fewer or additional components not illustrated in FIG. 11 (e.g., video cards, audio cards, additional network interfaces, peripheral devices, etc.). The processor 602, the memory 606, network interface(s) 604 may be coupled to the bus 610. Although illustrated as being coupled to the bus 610, the memory 606 may be directly coupled to the processor 602.

While the embodiments are described with reference to various implementations and exploitations, it will be understood that these embodiments are illustrative and that the scope of the subject matter is not limited to them. In general, techniques for augmented reality, in which a networked device is detected based on tracking data provided by the networked device as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the subject matter.

What is claimed is:

1. A method performed by an augmented reality (AR) device, the method comprising:
   receiving tracking data in a device interoperability framework protocol message from a networked device via a local network, wherein the tracking data includes descriptions of one or more visual properties of the networked device; and
   generating an augmented reality view in association with the networked device in response to detecting at least one of the one or more visual properties of the networked device in an image acquired from a camera view of the AR device.

2. The method of claim 1, further comprising:
   determining, based at least in part on the tracking data, a position of the networked device in the camera view of the AR device.

3. The method of claim 1, wherein generating the augmented reality view includes augmenting at least a portion of the augmented reality view with AR properties associated with the networked device.

4. The method of claim 1, wherein the one or more visual properties includes at least one member selected from the group consisting of size, shape, color, edges, feature points, corners, and flat surfaces.

5. The method of claim 1, wherein receiving the tracking data comprises:
   determining that the networked device is capable of providing the tracking data in accordance with a device interoperability framework protocol of the local network;
   sending a query to the networked device to request the tracking data from the networked device; and
   receiving the tracking data in response to the query.

6. The method of claim 5, further comprising:
   determining that the networked device is in proximity of the AR device prior to sending the query to the networked device.

7. The method of claim 1, wherein receiving the tracking data comprises receiving a broadcast message from the networked device, the broadcast message including the tracking data.

8. The method of claim 1, wherein the local network comprises a wireless local area network (WLAN).

9. The method of claim 1, wherein the tracking data comprises a multi-dimensional model for describing the networked device, and wherein the multi-dimensional model enables markerless detection of the networked device.

10. The method of claim 1, wherein the tracking data is received via a short-range radio frequency communication medium.

11. The method of claim 1, wherein the tracking data is included in an augmented reality property data set associated with the networked device, the augmented reality property data set embedded in the networked device.

12. The method of claim 1, wherein generating the augmented reality view comprises:
    obtaining the image using an integrated camera at the AR device;
    detecting at least one of the one or more visual properties of the networked device in the image; and
    displaying at least a portion of the image augmented with AR properties associated with the networked device.

13. The method of claim 1, further comprising:
    displaying the augmented reality view using an integrated display apparatus at the AR device.

14. An augmented reality (AR) device, comprising:
    a processor; and
    memory storing instructions, which when executed by the processor, cause the AR device to:
    receive tracking data in a device interoperability framework protocol message from a networked device via a local network, wherein the tracking data includes descriptions of one or more visual properties of the networked device; and
    generate an augmented reality view in association with the networked device in response to detecting at least one of the one or more visual properties of the networked device in an image acquired from a camera view of the AR device.

15. The AR device of claim 14, wherein the instructions further cause the processor to:
    determine, based at least in part on the tracking data, a position of the networked device in the camera view of the AR device.

16. The AR device of claim 14, wherein the instructions further cause the processor to:
    execute an AR application that generates the augmented reality view based on the camera view, wherein the augmented reality view is augmented with AR properties associated with the networked device.

17. The AR device of claim 14, further comprising:
    a display apparatus that displays the augmented reality view to a user of the AR device.

18. The AR device of claim 14, further comprising:
a network interface for communicating via the local network,
wherein the instructions, when executed by the processor, further cause the AR device to:
determine that the networked device is capable of providing the tracking data in accordance with a device interoperability framework protocol of the local network;
send a query to the networked device to request the tracking data from the networked device; and
receive the tracking data in response to the query.

19. The AR device of claim 18, wherein the network interface sends the query in response to the AR device determining that the networked device is in proximity of the AR device.

20. The AR device of claim 14, further comprising:
a network interface that receives a broadcast message from the networked device, the broadcast message including the tracking data.

21. A method performed by a networked device, the method comprising:
storing tracking data that includes descriptions of one or more visual properties of the networked device, the tracking data for enabling visual detection of the networked device by an augmented reality (AR) device; and
transmitting the tracking data in a device interoperability framework protocol message to the AR device via a local network.

22. The method of claim 21, wherein the one or more visual properties includes at least one member selected from the group consisting of size, shape, color, edges, feature points, corners, and flat surfaces.

23. The method of claim 21, further comprising:
receiving a query from the AR device requesting the tracking data,
wherein providing the tracking data is in response to the query.

24. The method of claim 21, further comprising:
providing an indication to the AR device that the networked device is capable of providing the tracking data in accordance with a device interoperability framework protocol of the local network.

25. The method of claim 21, further comprising:
broadcasting the tracking data via the local network in accordance with a device discovery protocol.

26. The method of claim 21, wherein the tracking data is included in an augmented reality data set stored at the networked device and provided to the AR device in response to a request from the AR device.

27. The method of claim 21, wherein the tracking data received from the networked device comprises a multi-dimensional model describing the networked device, wherein the multi-dimensional model enables markerless detection of the networked device.

28. A networked device, comprising:
a network interface to communicate via a local network;
a processor; and
a memory storing tracking data that includes descriptions of one or more visual properties of the networked device, the tracking data for enabling visual detection of the networked device by an augmented reality (AR) device,
the memory storing instructions, which when executed by the processor, cause the networked device to:
transmit the tracking data in a device interoperability framework protocol message to the AR device via the local network.

29. The networked device of claim 28, wherein the instructions cause the processor to:
receive a query from the AR device requesting the tracking data, and
provide the tracking data is in response to the query.

30. The networked device of claim 28, wherein the instructions cause the processor to:
provide an indication to the AR device that the networked device is capable of providing the tracking data in accordance with a device interoperability framework protocol of the local network.

* * * * *